J. D. AND E. M. TUCKER.
SPOKE TIGHTENER.
APPLICATION FILED DEC. 7, 1921.

1,424,530.  
Patented Aug. 1, 1922.

INVENTORS  
J. D. Tucker & E. M. Tucker  
BY  
ATTORNEY

UNITED STATES PATENT OFFICE.

EMMITT M. TUCKER AND JESSE D. TUCKER, OF SACRAMENTO, CALIFORNIA, ASSIGNORS TO TUCKER BROTHERS MANUFACTURING COMPANY, OF SACRAMENTO, CALIFORNIA, A CORPORATION.

SPOKE TIGHTENER.

1,424,530.      Specification of Letters Patent.      Patented Aug. 1, 1922.

Application filed December 7, 1921. Serial No. 520,552.

*To all whom it may concern:*

Be it known that we, EMMITT M. TUCKER and JESSE D. TUCKER, citizens of the United States, residing at Sacramento, county of Sacramento, State of California, have invented certain new and useful Improvements in Spoke Tighteners; and we do declare the following to be a full, clear, and exact description of the same, reference being had to the accompanying drawings and to the characters of reference marked thereon, which form a part of this application.

This invention relates to improvements in spoke tighteners, such as are used to apply between the felly and spokes of wooden wheels when shrinkage or wear occurs, the form of tightener shown in the present invention being a modification of or improvement over, that type shown in the copending application, Serial No. 500150 filed Sept. 12, 1921.

The principal object of the present invention is to provide a spoke tightening shim which not only provides an even bearing surface between the spoke and felly all around the former, but once in position, will not come off, even if further shrinkage of a spoke should again draw this member and the felly apart.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views.

Figure 1:
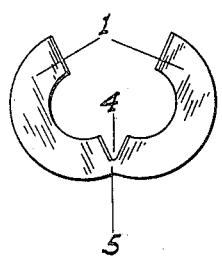
Fig. 1 is a plan view of our new shim, as shaped and opened ready to be placed in position.
Figure 2:
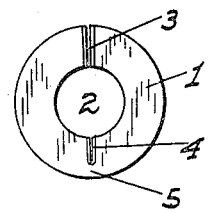
Fig. 2 is a similar view showing the shim as it appears after being placed in position.

Referring now more particularly to the characters of reference on the drawings, and particularly to Figs. 1 and 2, the numeral 1 denotes the shim itself, which is a one-piece member, preferably round, and stamped out of sheet metal of desired thickness.

A central orifice 2, equal to or slightly greater than the diameter of the tenon of the spoke which it is intended to engage is provided with the shim.

During the stamping process, the shim is cut through from the outer edge to the central hole as at 3, and in continuation with said cut another cut 4 extends from the hole 2 part way to the outer edge of the shim, the line of these cuts being preferably diametrical with respect to the hole 2. The latter cut then leaves a more or less flexible connecting web 5, between the two shim-portions thus formed, thus preventing them from falling apart, and keeping the shim as a single and unit member.

The two halves of the shim are then spread sufficiently so that the space between the two edges of the cut 3 is sufficient to readily pass the spoke-tenon therethrough, and the device is preferably sold in this shape.

After passing the shim about the tenon, the two halves are pinched together, the clamping tongs shown in our co-pending application for patent, Serial No. 522,065, filed Dec. 13, being preferably used for this purpose.

It will therefore be seen that when the shim is in position, and pinched or closed together, a bearing surface for the shoulder of the spoke is had all around the same, thus giving even bearing and wearing qualities to all parts concerned.

Figure 3:
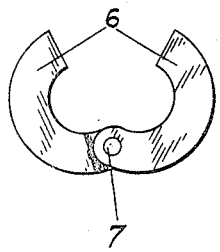
Fig. 3 is a plan view of a modified form.

In the type shown in Fig. 3, the shim is made of two separate and symmetrical halves 6, permanently hinged together as at 7 to lie in a common plane, the hinged portion being so arranged that the total thickness of the parts at the hinge is no greater than that of either half of the shim members 6.

This type may be inserted and closed together about the spoke tenon with the aid of the same tongs as above mentioned; or without the use of the tongs if desired, since the greater flexibility of the hinge over the integral web permits easier manipulation of th two members.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A spoke tightener comprising a shim member provided with an orifice to receive the tenon of a spoke, said shim being cut through from the outer edge to the orifice, and from the opposite side of the orifice to a point short of the adjacent outer edge; the shim before placement being spread apart at the cut-through edges to allow the tenon to pass therethrough; the opposite incision then spreading to form a V whose sides are in alinment with the first named edges, whereby on pinching the spread portions together the V-shaped incision will close proportionately with the closing of the cut-through edges.

2. A spoke tightener comprising a shim member provided with an orifice to receive the tenon of a spoke, said shim being cut through from the outer edge to the orifice, and from the opposite side of the orifice to a point short of the adjacent outer edge; the shim before placement being spread apart at the cut-through edges to allow the tenon to pass therethrough; whereby on pinching the outer edges of the spread portions together they will close simultaneously and symmetrically.

In testimony whereof we affix our signatures.

EMMITT M. TUCKER.
JESSE D. TUCKER.